(12) United States Patent
Ghosh et al.

(10) Patent No.: US 9,454,586 B2
(45) Date of Patent: Sep. 27, 2016

(54) SYSTEM AND METHOD FOR CUSTOMIZING ANALYTICS BASED ON USERS MEDIA AFFILIATION STATUS

(71) Applicant: Apple Inc., Cupertino, CA (US)

(72) Inventors: Rishab Aiyer Ghosh, San Francisco, CA (US); Lun Ted Cui, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/852,633

(22) Filed: Mar. 28, 2013

(65) Prior Publication Data

US 2013/0218862 A1 Aug. 22, 2013

Related U.S. Application Data

(63) Continuation-in-part of application No. 13/161,857, filed on Jun. 16, 2011, now Pat. No. 9,280,597, and a continuation-in-part of application No. 12/895,593, filed on Sep. 30, 2010, now Pat. No. 7,991,725, and a (Continued)

(51) Int. Cl.
*G06F 17/30* (2006.01)

(52) U.S. Cl.
CPC ... *G06F 17/30554* (2013.01); *G06F 17/30728* (2013.01)

(58) Field of Classification Search
CPC .................. G06F 17/30864; G06F 17/30867; G06F 17/30067; G06F 17/30997; G06F 17/30554; G06F 17/30728; G06Q 10/107
USPC ........................................................ 707/705
See application file for complete search history.

(56) References Cited

U.S. PATENT DOCUMENTS

| 6,151,585 A | 11/2000 | Altschuler et al. |
| 6,286,005 B1 | 9/2001 | Cannon |

(Continued)

FOREIGN PATENT DOCUMENTS

| JP | 2003288437 A | 10/2003 |
| WO | WO-2006073977 A1 | 7/2006 |

(Continued)

OTHER PUBLICATIONS

Makkonen et al., Topic Detection and Tracking with Spatio-Temporal Evidence published Spring 2003.

(Continued)

*Primary Examiner* — Tarek Chbouki
(74) *Attorney, Agent, or Firm* — Blakely, Sokoloff, Taylor & Zafman LLP

(57) ABSTRACT

A new approach is proposed that contemplates systems and methods to generate customized search results as well as metrics, such as aggregated sentiment, counts of targets or sources or citations, or aggregated gross impressions or exposure, of social media content items over a social network while discriminating between the perspectives of individuals from the media and individuals not from the media. This approach can be used to generate search results and/or metrics including only media perspectives, or excluding media perspectives. More specifically, while social media content items are retrieved from corpus based on certain search criteria, for the purpose of providing search results or providing aggregated metrics, the search criteria can include a media or non-media filter, which is applied to the authors posting social media content to exclude or include certain authors meeting media/non-media criteria. For the application of a non-media filter, content from media authors can be excluded, or ranked below content from non-media authors. Similarly, for a media filter, content from non-media authors can be excluded, or ranked below content from media authors.

18 Claims, 5 Drawing Sheets

Related U.S. Application Data continuation-in-part of application No. 12/628,801, filed on Dec. 1, 2009, now Pat. No. 8,244,664, and a continuation-in-part of application No. 12/628,791, filed on Dec. 1, 2009, now Pat. No. 8,688,701.

(60) Provisional application No. 61/355,912, filed on Jun. 17, 2010, provisional application No. 61/355,937, filed on Jun. 17, 2010, provisional application No. 61/617,524, filed on Mar. 29, 2012, provisional application No. 61/618,474, filed on Mar. 30, 2012.

(56) References Cited

U.S. PATENT DOCUMENTS

| | | | |
|---|---|---|---|
| 7,512,612 | B1 | 3/2009 | Akella et al. |
| 7,636,714 | B1 | 12/2009 | Lamping et al. |
| 7,885,844 | B1 | 2/2011 | Cohen et al. |
| 8,086,605 | B2 | 12/2011 | Xu et al. |
| 8,112,483 | B1* | 2/2012 | Emigh .................. G06F 21/36 709/206 |
| 8,166,026 | B1 | 4/2012 | Sadler |
| 8,166,925 | B2 | 5/2012 | Suggett |
| 8,352,549 | B2 | 1/2013 | Sacco et al. |
| 8,572,173 | B2 | 10/2013 | Briere et al. |
| 2003/0110056 | A1 | 6/2003 | Berghofer et al. |
| 2003/0229531 | A1 | 12/2003 | Heckerman et al. |
| 2004/0225592 | A1 | 11/2004 | Churquina |
| 2005/0060312 | A1 | 3/2005 | Curtiss et al. |
| 2005/0131897 | A1 | 6/2005 | Grasso et al. |
| 2005/0154690 | A1 | 7/2005 | Nitta et al. |
| 2005/0192957 | A1 | 9/2005 | Newbold |
| 2005/0256866 | A1 | 11/2005 | Lu et al. |
| 2006/0041543 | A1 | 2/2006 | Achlioptas |
| 2006/0059055 | A1 | 3/2006 | Lin |
| 2006/0074836 | A1 | 4/2006 | Gardner et al. |
| 2006/0112111 | A1* | 5/2006 | Tseng et al. .................. 707/100 |
| 2006/0112146 | A1 | 5/2006 | Song et al. |
| 2006/0218577 | A1 | 9/2006 | Goodman et al. |
| 2006/0248073 | A1 | 11/2006 | Jones et al. |
| 2006/0294085 | A1 | 12/2006 | Rose et al. |
| 2006/0294086 | A1 | 12/2006 | Rose et al. |
| 2006/0294134 | A1 | 12/2006 | Berkhim et al. |
| 2007/0011155 | A1* | 1/2007 | Sarkar .............................. 707/5 |
| 2007/0027744 | A1 | 2/2007 | Carson et al. |
| 2007/0078699 | A1 | 4/2007 | Scott et al. |
| 2007/0112761 | A1* | 5/2007 | Xu et al. ........................... 707/5 |
| 2007/0121843 | A1 | 5/2007 | Atazaky et al. |
| 2007/0124432 | A1 | 5/2007 | Holtzman et al. |
| 2007/0150398 | A1 | 6/2007 | Rossen et al. |
| 2007/0156636 | A1 | 7/2007 | Norton et al. |
| 2007/0156747 | A1* | 7/2007 | Samuelson .................. 707/102 |
| 2007/0168533 | A1 | 7/2007 | Canright et al. |
| 2007/0208613 | A1 | 9/2007 | Backer |
| 2007/0214097 | A1* | 9/2007 | Parsons et al. ............... 706/12 |
| 2007/0219863 | A1 | 9/2007 | Park et al. |
| 2007/0226248 | A1 | 9/2007 | Darr |
| 2007/0282867 | A1 | 12/2007 | Mcallister et al. |
| 2007/0297405 | A1 | 12/2007 | He |
| 2008/0004942 | A1 | 1/2008 | Calabria |
| 2008/0010253 | A1 | 1/2008 | Sidhu et al. |
| 2008/0033919 | A1* | 2/2008 | Arrouye ............ G06F 17/30997 |
| 2008/0059466 | A1 | 3/2008 | Luo et al. |
| 2008/0104225 | A1 | 5/2008 | Zhang et al. |
| 2008/0133426 | A1 | 6/2008 | Porat et al. |
| 2008/0208911 | A1* | 8/2008 | Lee et al. .................... 707/104.1 |
| 2008/0215429 | A1 | 9/2008 | Ramer et al. |
| 2008/0215557 | A1 | 9/2008 | Ramer et al. |
| 2008/0215571 | A1 | 9/2008 | Huang et al. |
| 2008/0275833 | A1 | 11/2008 | Zhou et al. |
| 2008/0288305 | A1 | 11/2008 | LaLuzerne et al. |
| 2008/0288596 | A1 | 11/2008 | Smith et al. |
| 2008/0313011 | A1 | 12/2008 | Rose et al. |
| 2009/0006388 | A1* | 1/2009 | Ives et al. .......................... 707/5 |
| 2009/0049038 | A1 | 2/2009 | Gross |
| 2009/0106224 | A1 | 4/2009 | Roulland et al. |
| 2009/0106244 | A1 | 4/2009 | Dash et al. |
| 2009/0119173 | A1* | 5/2009 | Parsons ................ G06Q 10/107 705/319 |
| 2009/0157490 | A1* | 6/2009 | Lawyer .......................... 705/11 |
| 2009/0234828 | A1 | 9/2009 | Tu |
| 2009/0240647 | A1 | 9/2009 | Green et al. |
| 2009/0276500 | A1 | 11/2009 | Karmarkar |
| 2009/0319342 | A1 | 12/2009 | Shilman et al. |
| 2010/0058196 | A1 | 3/2010 | Krishnan et al. |
| 2010/0070448 | A1 | 3/2010 | Omoigui |
| 2010/0070485 | A1* | 3/2010 | Parsons et al. ............... 707/709 |
| 2010/0100537 | A1 | 4/2010 | Druzgalski et al. |
| 2010/0119053 | A1 | 5/2010 | Goeldi |
| 2010/0121817 | A1 | 5/2010 | Meyer |
| 2010/0121839 | A1 | 5/2010 | Meyer |
| 2010/0174692 | A1 | 7/2010 | Meyer |
| 2010/0228614 | A1* | 9/2010 | Zhang .................... G06Q 10/10 705/14.16 |
| 2010/0306192 | A1 | 12/2010 | Kapur et al. |
| 2011/0004465 | A1 | 1/2011 | Rose et al. |
| 2011/0022602 | A1 | 1/2011 | Luo et al. |
| 2011/0078156 | A1 | 3/2011 | Koss |
| 2011/0093459 | A1 | 4/2011 | Dong et al. |
| 2011/0191372 | A1 | 8/2011 | Kaushansky et al. |
| 2011/0212717 | A1 | 9/2011 | Rhoads et al. |
| 2012/0166438 | A1 | 6/2012 | Wu et al. |

FOREIGN PATENT DOCUMENTS

| | | | |
|---|---|---|---|
| WO | WO2006/116516 | A2 | 11/2006 |
| WO | WO2008/006059 | A2 | 1/2008 |

OTHER PUBLICATIONS

Guha, R., Kumar, R., Raghavan, P., and Tomkins, A. 2004. Propagation of trust and distrust. In Proceedings of the 13th International Conference on World Wide Web (New York, NY, USA, May 17-20, 2004). WWW '04. ACM, New York, NY, pp. 403-412.

Ziegler, C. and Lausen, G. 2005. Propagation Models for Trust and Distrust in Social Networks. Information Systems Frontiers 7, 4-5 (Dec. 2005), 337-358.

Tao, Yufei et al: "Selectivity Estimation of Predictive Spatio-Temporal Queries", Proceedings 19th International Conference on Data Engineering (ICDE'2003). Bangladore, India, Mar. 5-8, 2003: pp. 417-428.

Dai, Na et al: "Mining Anchor Text Trends for Retrieval" Mar. 28, 2010; pp. 127-139.

Ashkan, Azin et al "Classifying and Characterizing Query Intent", Apr. 6, 2009, pp. 578-586.

Garfield, E.: "Citation Analysis as a Tool in Journal Evaluation", 1972, pp. 527-544, XP002381248.

Johnson, Caleb: "Likebutton.me Reveals What Your Friends 'Like' Across the Web"; Apr. 26, 2010, pp. 1-7; XP000002656471.

Anonymous: "H-index", Wikipedia, Internet Article, Jun. 10, 2010; pp. 1-3; XP000002656472.

Dietz, Laura et al: "Unsupervised Prediction of Citation Influences", Proceedings of the 24th International Conference on Machine Learning, Jun. 20, 2007; pp. 233-240; XP55004362.

Huang, Jeff et al: "Conversational Tagging in Twitter", Proceedings of the 21st ACM Conference on Hypertext and Hypermedia; Jun. 13, 2010; p. 173; XP55004356.

Page, L. et al: "The PageRank Citation Ranking: Bringing Order to the Web", Internet Citation; Jan. 29, 1998; XP002213518.

Massa, Paolo et al: "Using Trust in Recommender Systems: An Experimental Analysis"; Feb. 26, 2004; pp. 221-235, section 1.1; pp. 222-223, sections 1.3 and 2; pp. 225-227.

Liu, "Co-authorship networks in the digital library research community", 2005, Elsevier, Information Processing and Management 41 (2005) pp. 1462-1480.

Von Der Weth, "Towards an objective assessment of centrality measures in reputation systems", 2007, IEEE, 0-7695-2913.

Zhou, "Powertrust: A robust and scalable reputation system for trusted peer-to-peer computing", 2007, IEEE, 1-45-921907.

Lu at al., "Finding Query Suggestions for PubMed", 2009, AMIA.

Fan, et al., "Suggesting Topic-Based Query Terms as Your Type", 2010 12th International Asia-Pacific Web Conference (Apr. 2010).

* cited by examiner

SYSTEM AND METHOD FOR CUSTOMIZING ANALYTICS BASED ON USERS MEDIA AFFILIATION STATUS

RELATED APPLICATIONS

This application is a continuation-in-part of current copending U.S. application Ser. No. 13/161,857 filed Jun. 16, 2011, which claims the benefit of U.S. Provisional Patent Application Nos. 61/355,912 and 61/355,937, all filed Jun. 17, 2010. U.S. application Ser. No. 13/161,857 is also a continuation in part of U.S. Pat. No. 7,991,725 issued Aug. 2, 2011, a continuation in part of U.S. Pat. No. 8,244,664 issued Aug. 14, 2012, and a continuation in part of current copending U.S. application Ser. No. 12/628,791 filed Dec. 1, 2009. All of the above-identified applications are incorporated herein by reference.

This application claims the benefit of U.S. Provisional Patent Application No. 61/617,524, filed Mar. 29, 2012, and entitled "Social Analysis System," and is hereby incorporated herein by reference.

This application claims the benefit of U.S. Provisional Patent Application No. 61/618,474, filed Mar. 29, 2012, and entitled "GEO-Tagging Enhancements," and is hereby incorporated herein by reference.

BACKGROUND

Knowledge is increasingly more germane to our exponentially expanding information-based society. Perfect knowledge is the ideal that participants seek to assist in decision making and for determining preferences, affinities, and dislikes. Practically, perfect knowledge about a given topic is virtually impossible to obtain unless the inquirer is the source of all of information about such topic (e.g., autobiographer). Armed with more information, decision makers are generally best positioned to select a choice that will lead to a desired outcome/result (e.g., which restaurant to go to for dinner). However, as more information is becoming readily available through various electronic communications modalities (e.g., the Internet), one is left to sift through what is amounting to a myriad of data to obtain relevant and, more importantly, trust worthy information to assist in decision making activities. Although there are various tools (e.g., search engines, community boards with various ratings), there lacks any indicia of personal trustworthiness (e.g., measure of the source's reputation and/or influence) with located data.

Currently, a person seeking to locate information to assist in a decision, to determine an affinity, and/or identify a dislike can leverage traditional non-electronic data sources (e.g., personal recommendations—which can be few and can be biased) and/or electronic data sources such as web sites, bulletin boards, blogs, and other sources to locate (sometimes rated) data about a particular topic/subject (e.g., where to stay when visiting San Francisco). Such an approach is time consuming and often unreliable as with most of the electronic data there lacks an indicia of trustworthiness of the source of the information. Failing to find a plethora (or spot on) information from immediate non-electronic and/or electronic data source(s), the person making the inquiry is left to make the decision using limited information, which can lead to less than perfect predictions of outcomes, results, and can lead to low levels of satisfaction undertaking one or more activities for which information was sought.

Current practices also do not leverage trustworthiness of information or, stated differently, attribute a value to the influence of the source of data (e.g., referral). With current practices, the entity seeking the data must make a value judgment on the influence of the data source. Such value judgment is generally based on previous experiences with the data source (e.g., rely on Mike's restaurant recommendations as he is a chef and Laura's hotel recommendations in Europe as she lived and worked in Europe for 5 years). Unless the person making the inquiry has an extensive network of references from which to rely to obtain desired data needed to make a decision, most often, the person making the decision is left to take a risk or "roll the dice" based on best available non-attributed (non-reputed) data. Such a prospect often leads certain participants from not engaging in a contemplated activity. Influence accrued by persons in such a network of references is subjective. In other words, influence accrued by persons in such a network of references appear differently to each other person in the network, as each person's opinion is formed by their own individual networks of trust.

Real world trust networks follow a small-world pattern, that is, where everyone is not connected to everyone else directly, but most people are connected to most other people through a relatively small number of intermediaries or "connectors". Accordingly, this means that some individuals within the network may disproportionately influence the opinion held by other individuals. In other words, some people's opinions may be more influential than other people's opinions.

As referred to herein, influence is provided for augmenting reputation, which may be subjective. In some embodiments, influence is provided as an objective measure. For example, influence can be useful in filtering opinions, information, and data. It will be appreciated that reputation and influence provide unique advantages in accordance with some embodiments for the ranking of individuals or products or services of any type in any means or form.

Another issue facing an online user is the difficulty to search for content or retrieve metrics that actually addresses his/her problem from his/her own perspective or from someone whose opinion the user values highly. Even when the user is able to find the content that is relevant to address his/her problem, such content is most likely to be of "one size fits all" type that addresses concerns of the general public while does not target at the specific need of the user as an individual. Although some online vendors do keep track of web surfing and/or purchasing history or tendency of a user online for the purpose of recommending services and products to the user based on such information, such online footprint of the user is only passively gathered or monitored, which often does not truly reflect the user's real intention or interest. Therefore, there is a need for search results and metrics customization from a user's perspective.

In addition, the user may not be able to recognize whether the content is from a creditable source or what the experts think of it. Therefore, there is a need to identify sources of relative expertise in the field of the user's interest and from the user's perspective.

The foregoing examples of the related art and limitations related therewith are intended to be illustrative and not exclusive. Other limitations of the related art will become apparent upon a reading of the specification and a study of the drawings.

DETAILED DESCRIPTION OF EMBODIMENTS

Figure 1:
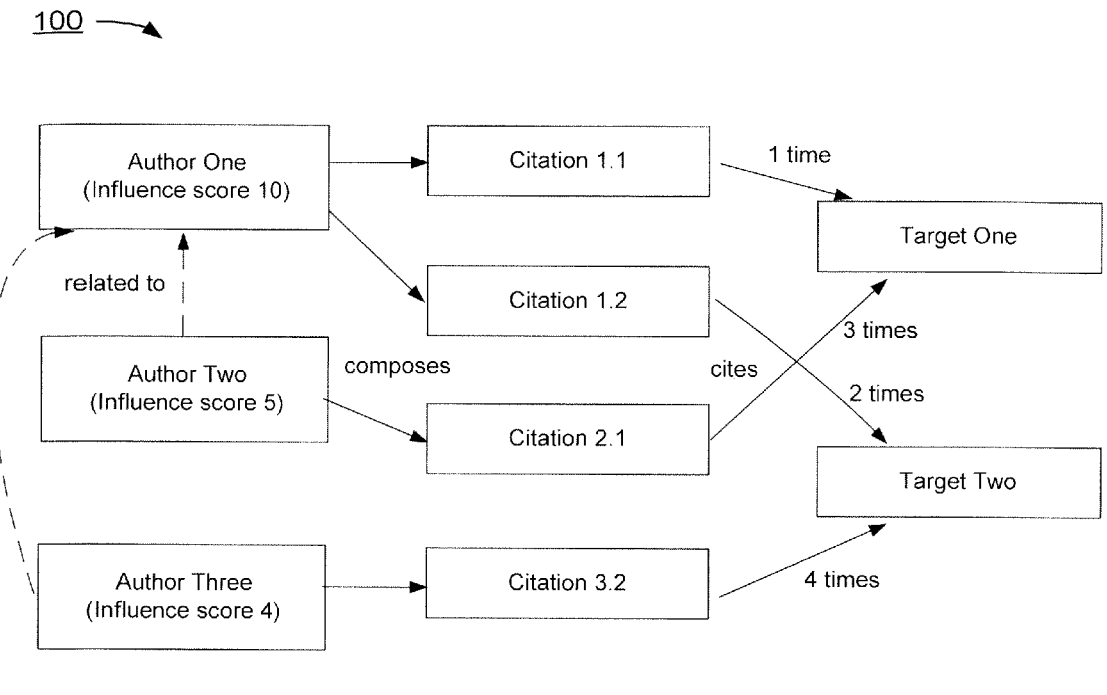
FIG. 1 depicts an example of a citation graph used to support citation search.

The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates systems and methods to generate customized search results as well as metrics, such as aggregated sentiment, counts of targets or sources or citations, or aggregated gross impressions or exposure, of social media content items over a social network while discriminating between the perspectives of individuals from the media and individuals not from the media. Here, media perspectives or individuals from the media could be defined as individuals who are associated with any professional new reporting agency or outlet. Media perspectives could also be broadened to include popular bloggers or celebrities. More specifically, once the social media content items are retrieved from a social network based on certain search criteria, the media affiliation status of authors of all the content items retrieved are identified via various means. The media affiliation status maybe defined as whether or not the author is affiliated to a "media source" such as a professional news reporting agency or outlet. The identified media affiliation status of the content items can then be utilized to generate a customized search results and metrics from the perspective of non-media authors by removing or down-ranking content items from authors who have been identified as media-affiliation authors from the search result or calculated metrics. With such an approach, the result is biased towards posts or reports from individuals "on the ground" who may be in a better position to provide accurate first-hand witness account on the social network about events happening in real time, rather than those from professional news agencies who often rely on delayed second-hand information or sources. Similarly, a query for media results can be applied, by giving preference to media-affiliation authors' content over non-media author content, or excluding non-media author content.

This approach can be used to generate search results and/or metrics including only media perspectives, or excluding media perspectives. Media perspectives or individuals from the media could be defined as individuals who are associated with any professional new reporting agency or outlet. Media perspectives could also be broadened to include popular bloggers or celebrities.

As referred to hereinafter, a social media network or social network, can be any publicly accessible web-based platform or community that enables its users/members to post, share, communicate, and interact with each other. For non-limiting examples, such social media network can be but is not limited to, Facebook®, Google+®, Twitter®, LinkedIn®, blogs, forums, or any other web-based communities.

As referred to hereinafter, a user's activities/content items on a social media network include but are not limited to, citations, Tweets, replies and/or re-tweets to the tweets, posts, comments to other users' posts, opinions (e.g., Likes), feeds, connections (e.g., add other user as friend), references, links to other websites or applications, or any other activities on the social network. Such social content items are alternatively referred to hereinafter as citations, Tweets, or posts. In contrast to a typical web content, which creation time may not always be clearly associated with the content, one unique characteristics of a content on the social network is that there is an explicit time stamp associated with the content, making it possible to establish a pattern of the user's activities over time on the social network.

Citation Graph

An illustrative implementation of systems and methods described herein in accordance with some embodiments includes a citation graph 100 as shown in FIG. 1. In the example of FIG. 1, the citation graph 100 comprises a plurality of citations 104, each describing an opinion of the object by a source/subject 102. The nodes/entities in the citation graph 100 are characterized into two categories, 1) subjects 102 capable of having an opinion or creating/making citations 104, in which expression of such opinion is explicit, expressed, implicit, or imputed through any other technique; and 2) objects 106 cited by citations 104, about which subjects 102 have opinions or make citations. Each subject 102 or object 106 in graph 100 represents an influential entity, once an influence score for that node has been determined or estimated. More specifically, each subject 102 may have an influence score indicating the degree to which the subject's opinion influences other subjects and/or a community of subjects, and each object 106 may have an influence score indicating the collective opinions of the plurality of subjects 102 citing the object.

In some embodiments, subjects 102 representing any entities or sources that make citations may correspond to one or more of the following: As discussed hereinafter, each source or subject can be but is not limited to an internet author or user of social media services.

Representations of a person, web log, and entities representing Internet authors or users of social media services including one or more of the following: blogs, Twitter®, or reviews on Internet web sites;

Users of microblogging services such as Twitter®;

Users of social networks such as MySpace® or Facebook®, bloggers;

Reviewers, who provide expressions of opinion, reviews, or other information useful for the estimation of influence.

In some embodiments, objects 106 cited by the citations 104 may correspond to one or more of the following: Internet web sites, blogs, videos, books, films, music, image, video, documents, data files, objects for sale, objects that are reviewed or recommended or cited, subjects/authors, natural or legal persons, citations, or any entities that are or may be associated with a Uniform Resource Identifier (URI), or any form of product or service or information of any means or form for which a representation has been made.

In some embodiments, the links or edges 104 of the citation graph 100 represent different forms of association between the subject nodes 102 and the object nodes 106, such as citations 104 of objects 106 by subjects 102. For non-limiting examples, citations 104 can be created by authors citing targets at some point of time and can be one of link, description, keyword or phrase by a source/subject 102 pointing to a target (subject 102 or object 106). Here, citations may include one or more of the expression of opinions on objects, expressions of authors in the form of Tweets, blog posts, reviews of objects on Internet web sites, Wikipedia® entries, postings to social media such as Twitter® or Jaiku®, postings to websites, postings in the form of reviews, recommendations, or any other form of citation made to mailing lists, newsgroups, discussion forums, comments to websites or any other form of Internet publication.

In some embodiments, citations 104 can be made by one subject 102 regarding an object 106, such as a recommendation of a website, or a restaurant review, and can be treated as representation an expression of opinion or description. In some embodiments, citations 104 can be made by one subject 102 regarding another subject 102, such as a recommendation of one author by another, and can be treated as representing an expression of trustworthiness. In some embodiments, citations 104 can be made by certain object 106 regarding other objects, wherein the object 106 is also a subject.

In some embodiments, citation 104 can be described in the format of (subject, citation description, object, timestamp, type). Citations 104 can be categorized into various types based on the characteristics of subjects/authors 102, objects/targets 106 and citations 104 themselves. Citations 104 can also reference other citations. The reference relationship among citations is one of the data sources for discovering influence network.

Figure 2:
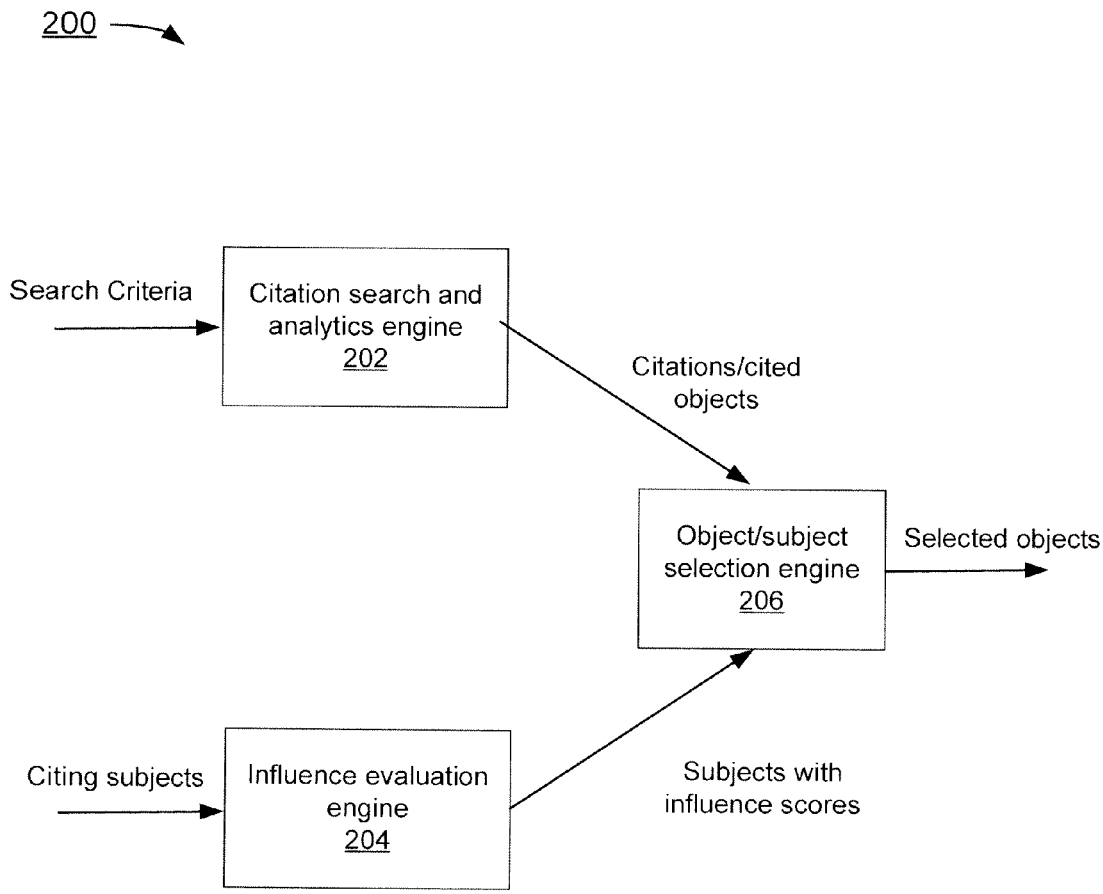
FIG. 2 depicts an example of a system diagram to support customizing search results from user's perspective.

FIG. 2 depicts an example of a system diagram to support customizing search results from user's perspective. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 2, the system 200 includes at least citation search and analytics engine 204, influence evaluation engine 204, and object/subject selection engine 206. As used herein, the term engine refers to software, firmware, hardware, or other component that is used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

In the example of FIG. 2, each of the engines can run on one or more hosting devices (hosts). Here, a host can be a computing device, a communication device, a storage device, or any electronic device capable of running a software component. For non-limiting examples, a computing device can be but is not limited to a laptop PC, a desktop PC, a tablet PC, an iPod®, an iPhone®, an iPad®, Google's Android® device, a PDA, or a server machine. A storage device can be but is not limited to a hard disk drive, a flash memory drive, or any portable storage device. A communication device can be but is not limited to a mobile phone.

In the example of FIG. 2, citation search and analytics engine 202, influence evaluation engine 204, and object/subject selection engine 206 each has a communication interface (not shown), which is a software component that enables the engines to communicate with each other following certain communication protocols, such as TCP/IP protocol, over one or more communication networks (not shown). Here, the communication networks can be but are not limited to, internet, intranet, wide area network (WAN), local area network (LAN), wireless network, Bluetooth®, WiFi, and mobile communication network. The physical connections of the network and the communication protocols are well known to those of skill in the art.

Citation Search

In the example of FIG. 2, citation search and analytics engine 202 enables a citation search process, which unlike the "classical web search" approaches that is object/target-centric and focuses only on the relevance of the objects 106 to the searching criteria, the search process adopted by citation search and analytics engine 202 is "citation" centric, focusing on influence of the citing subjects 102 that cite the objects. In addition, the classical web search retrieves and ranks objects 106 based on attributes of the objects, while the proposed search approach adds citation 104 and subject/author 102 dimensions. The extra metadata associated with subjects 102, citations 104, and objects 106 provide better ranking capability, richer functionality and higher efficiency for the searches.

In some embodiments, the citation search/query request processed by citation search and analytics engine 202 may accept and enforce various criteria/terms on citation searching, retrieving and ranking, each of which can either be explicitly described by a user or best guessed by the system based on internal statistical data. Such criteria include but are not limited to, a) Constraints for the citations, including but are not limited to,
  Description: usually the text search query;
  Time range of the citations;
  Author: such as from particular author or sub set of authors;
  Type: types of citations;
b) Types of the cited objects: the output can be objects, authors or citations of the types including but are not limited to,
  Target types: such as web pages, images, videos, people
  Author types: such as expert for certain topic
  Citation types: such as tweets, comments, blog entries
c) Ranking bias of the cited objects: which can be smartly guessed by the system or specified by user including but are not limited to,
  Time bias: recent; point of time; event; general knowledge; auto
  View point bias: such as general view or perspective of certain people.
  Type bias: topic type, target type.

Influence Evaluation

In the example of FIG. 2, influence evaluation engine 204 calculates influence scores of entities (subjects 102 and/or objects 106), wherein such influence scores can be used to determine at least in part, in combination with other methods and systems, the ranking of any subset of objects 106 obtained from a plurality of citations 104 from citation search results.

In some embodiments, some subjects/authors 102 who create the citations 104 can be related to each other, for a non-limiting example, via an influence network or community. The influence network of a user includes subjects that are connected to the user either directly or indirectly through other sources (e.g., friend's friends). In some embodiments, influence evaluation engine 204 constructs a scored subject list of a user by flattening the user's influence network of sources/subjects/contacts up to a given number of degrees/levels/depth, where each item on the list is a subject/source. The influence evaluation engine 204 assigns a score to each of the subjects on the list to reflect the subject's potential influence on the user and/or the closeness of its connection with the user.

In some embodiments, the influence network of a user can be private, which is only accessible by the user once he/she authenticates him/herself to the system. No other party may obtain search results from a user's perspective if the user keeps his/her network private.

In some embodiments, the influence network of a user can be open to public, such as a user's connections visible on social networking sites of Facebook and MySpace®. Consequently, any interested party may get access to the user's influence network of connections in order to obtain search results from that user's perspective instead of his/her own. For a non-limiting example, a user may look at the same issue from the perspectives of different parties whose opinions the user trusts or values highly.

In some embodiments, influence evaluation engine 204 calculates the influence score of a subject based on the one or more of:

Influence of the subject on and/or respect from the user;

The number and length of paths from the subject to the user in the influence network, where the user can be directly or indirectly linked to the subjects on any number of paths comprising of one or more links. Here, a path between a user and a subject may include a direct or an indirect link from the user to an intermediate entity, prefixed to a direct or an indirect path from the intermediate entity to the subject within a predefined maximum length.

In some embodiments, the influence evaluation engine 204 may calculate the influence score of the subject on the user as the influence-weighted sum of the number of the paths from the subject to the user, wherein the weight of each path may be inversely adjusted by the length of the path. For a non-limiting example, if there are two paths from the subject of user-specific influence of 6 to the user with lengths of 2 and 3, respectively, the influence score of the subject on the user can be calculated as $6*(\frac{1}{2}+\frac{1}{3})=5$.

In some embodiments, influence evaluation engine 204 measures influence and reputation of subjects 102 that compose the plurality of citations 104 citing the plurality of objects 106 on dimensions that are related to, for non-limiting examples, one or more of the specific topic or objects (e.g., automobiles or restaurants) cited by the subjects, or form of citations (e.g., a weblog or Wikipedia® entry or news article or Twitter® feed), or search terms (e.g., key words or phrases specified in order to define a subset of all entities that match the search term(s)), in which a subset of the ranked entities are made available based on selection criteria, such as the rank, date or time, or geography/location associated with the entity, and/or any other selection criteria.

In some embodiments, influence evaluation engine 204 determines an influence score for a first subject or source at least partly based on how often a first subject is cited or referenced by a (another) second subject(s). Here, each of the first or the second subject can be but is not limited to an internet author or user of social media services, while each citation describes reference by the second subject to a citation of an object by the first subject. The number of the citations or the citation score of the first subject by the second subjects is computed and the influence of the second subjects citing the first subject can also be optionally taken into account in the citation score. For a non-limiting example, the influence score of the first subject is computed as a function of some or all of: the number of citations of the first subject by second subjects, a score for each such citation, and the influence score of the second subjects. Once computed, the influence of the first subject as reflected by the count of citations or citation score of the first subject or subject can be displayed to the user at a location associated with the first subject, such as the "profile page" of the first subject, together with a list of the second subjects citing the first subjects, which can be optionally ranked by the influences of the second subject.

In some embodiments, influence evaluation engine 204 optimizes the estimation of influence for different contexts and requirements of performance, memory, graph topology, number of entities, and/or any other context and/or requirement, by any combination of the operations described above in paragraphs above, and any similar operations involving metrics including but not limited to values comprising: the number of potential source entities to the entity for which influence is to be estimated, the number of potential target entities, the number of potential directed paths between any one entity and any other entity on any or all given dimensions, the number of potential directed paths that include the entity, the number of times within a defined period that a directed link from the entity is used for a scoring, search or other operation(s).

In some embodiments, influence evaluation engine 204 computes "relative expertise" of a subject as a measure of the subject's expertise in a topic relative to a larger population of multiple sources and subjects. Here, the relative expertise of the subject is a function of the share of the subject's citations matching the query term relative to the share of all subjects' citations matching the query term, weighted by the influence of subjects. This allows the identification of "experts" on "topics" without any pre-defined categorization of topics or pre-computation of expertise, enabling determination of expertise on any query term in real-time.

In some embodiments, influence evaluation engine 204 may adopt a semantic graph of related terms, which allows the "match to query term" used for computing the relative expertise of the subject to be broader than a match of the query term itself. With such a semantic graph, influence evaluation engine 204 regards a match to a query term have been made, possibly with a different match score, if a match is made for other terms in the semantic graph that are close to the query term. for a non-limiting example, "ibuprofen" and "terfenadine" may both match "medicine" and each other via the semantic graph, so if the query term is "ibuprofen," citations matching "medicine" or "terfenadine" can be considered along with citations matching the query term "ibuprofen" itself.

Object Ranking and Selection

In the example of FIG. 2, object/subject selection engine 206 utilizes influence scores of the citing subjects 102 on the scored subject list of the user and the number of their citations 104 to determine the ranking and selection of objects 106 from the user's perspective, in combination with other ranking criteria that include but are not limited to, influence scores of the citing subjects, date or time, geographical location associated with the objects, and/or any other selection criteria. More specifically, object/subject selection engine 206 ranks the objects appearing in the search result based on a ranking function that takes into consideration the perspective influence scores of the subjects of each matching citation, where the perspective influence scores can be obtained from the user's subject list for those citing subjects that are on the list. If a subject of a matching citation does not appear on the user's subject list, however, object/subject selection engine 206 assigns a low score to the citation during ranking.

Figure 3:
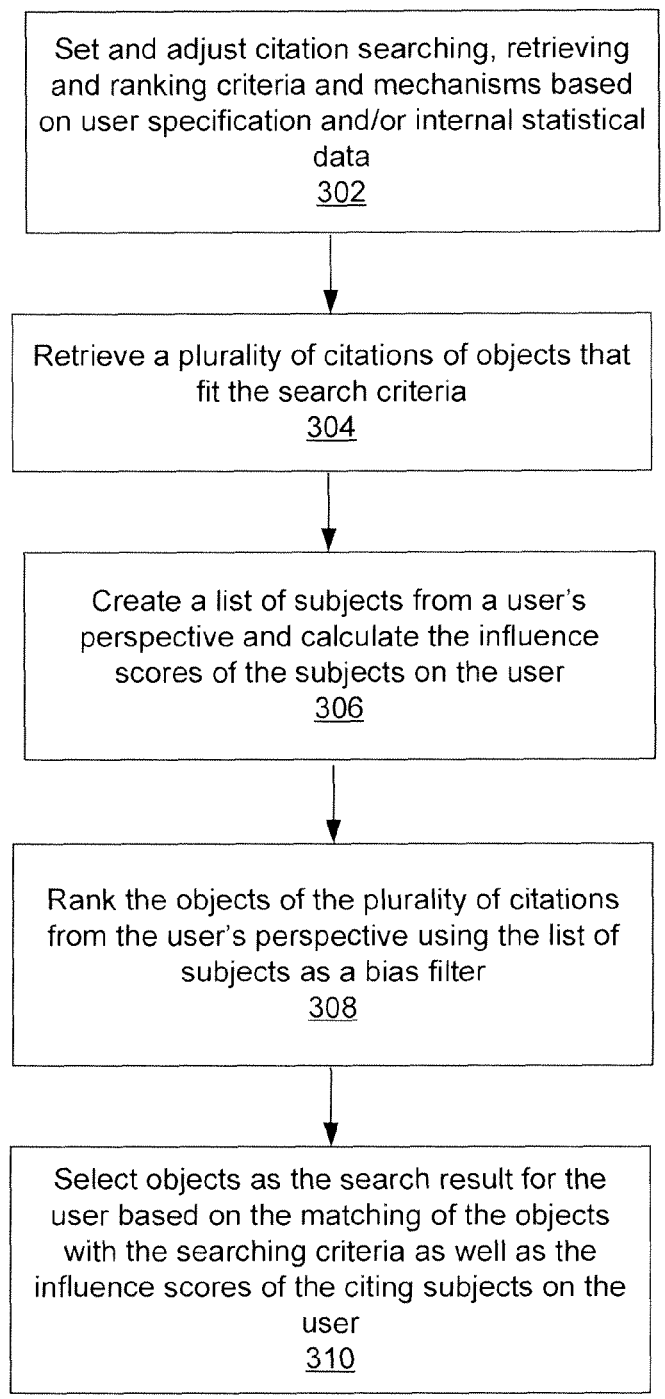
FIG. 3 depicts an example of a flowchart of a process to support customizing search results of cited objects from user's perspective.

FIG. 3 depicts an example of a flowchart of a process to support customizing search results of cited objects from user's perspective. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 3, the flowchart 300 starts at block 302 where citation searching, retrieving and ranking criteria and mechanisms are set and adjusted based on user specification and/or internal statistical data. The flowchart 300 continues to block 304 where a plurality of citations of objects that fit the search criteria, such as text match, time filter, author filter, type filter, are retrieved. The flowchart 300 continues to block 306 where a list of subjects is created from a user's perspective and the influence scores of the subjects on the user are calculated. The flowchart 300 continues to block 308 where the list of subjects is used as a bias filter to rank the objects of the plurality of citations from the user's perspective. The flowchart 300 ends at block 310 where objects are selected as the search result for the user based on the matching of the objects with the searching criteria as well as the influence scores of the citing subjects on the user.

In some embodiments, object/subject selection engine 206 determines the qualities of the cited objects by examining the distribution of influence scores of subjects citing the objects in the search results. For a non-limiting example, one measure of the influence distribution is the ratio of the number of citations from the "influential" and the "non-influential" subjects, where "influential" subjects may, for a non-limiting example, have an influence score higher than a threshold determined by the percentile distribution of all influence scores. Object/subject selection engine 206 accepts only those objects that show up in the citation search results if their citation ratios from "influential" and "non-influential" subjects are above a certain threshold while others can be marked as spam if the ratio of their citation ratios from "influential" and "non-influential" subjects fall below the certain threshold, indicating that they are most likely cited from spam subjects.

In some embodiments, object/subject selection engine 206 calculates and ranks cited objects by treating citations of the objects as connections having positive or negative weights in a weighted citation graph. A citation with implicit positive weight can include, for a non-limiting example, a re-tweet or a link between individual blog posts or web cites, while a citation with negative weight can include, for a non-limiting example, a statement by one subject 102 that another source is a spammer.

In some embodiments, object/subject selection engine 206 uses citations with negative weights in a citation graph-based rank/influence calculation approach to propagate negative citation scores through the citation graph. Assigning and propagating citations of negative weights makes it possible to identify clusters of spammers in the citation graph without having each spammer individually identified. Furthermore, identifying subjects/sources 102 with high influence and propagating a few negative citations from such subjects is enough to mark an entire cluster of spammers negatively, thus reducing their influence on the search result.

In some embodiments, object/subject selection engine 206 presents the generated search results of cited objects to a user who issues the search request or provides the generated search results to a third party for further processing. In some embodiments, object/subject selection engine 206 presents to the user a score computed from a function combining the count of citations and the influence of the subjects of the citations along with the search result of the objects. In some embodiments, object/subject selection engine 206 displays multiple scores computed from functions combining the counts of subsets of citations and the influence of the source of each citation along with the search result, where each subset may be determined by criteria such as the influence of the subjects, or attributes of the subjects or the citations. For non limiting-examples, the following may be displayed to the user—"5 citations from Twitter®; 7 citations from people in Japan; and 8 citations in English from influential users." The subsets above may be selected and/or filtered either by the object/subject selection engine 206 or by users.

In some embodiments, object/subject selection engine 206 selects for display of every object in the search result, one or more citations and the subjects of the citations on the basis of criteria such as the recency or the influence of their citing subjects relative to the other citations in the search result. Object/subject selection engine 206 then displays the selected citations and/or subjects in such a way that the relationship between the search result, the citations and the subjects of the citations are made transparent to a user.

Subject Ranking and Selection

In the example of FIG. 2, object/subject selection engine 206 may alternatively utilize the scored subject list of a user for the ranking and selection of subjects 102 instead of objects 106 from the perspective of the user who conducts the search or any other subject entity, including, in a non-limiting example, any subject entity chosen by the user to provide "people search" or "expert search" functionality. Here, for "people/expert search", the search results for a query are the subjects of citations matching the query, rather than objects of the citations, weighted by among other factors the relative expertise of the subjects. As discussed above, the relative expertise reflects the subject's interest or expertise in a certain topic or subject, thus making the subject eligible as a candidate in the people search for experts.

Figure 4:
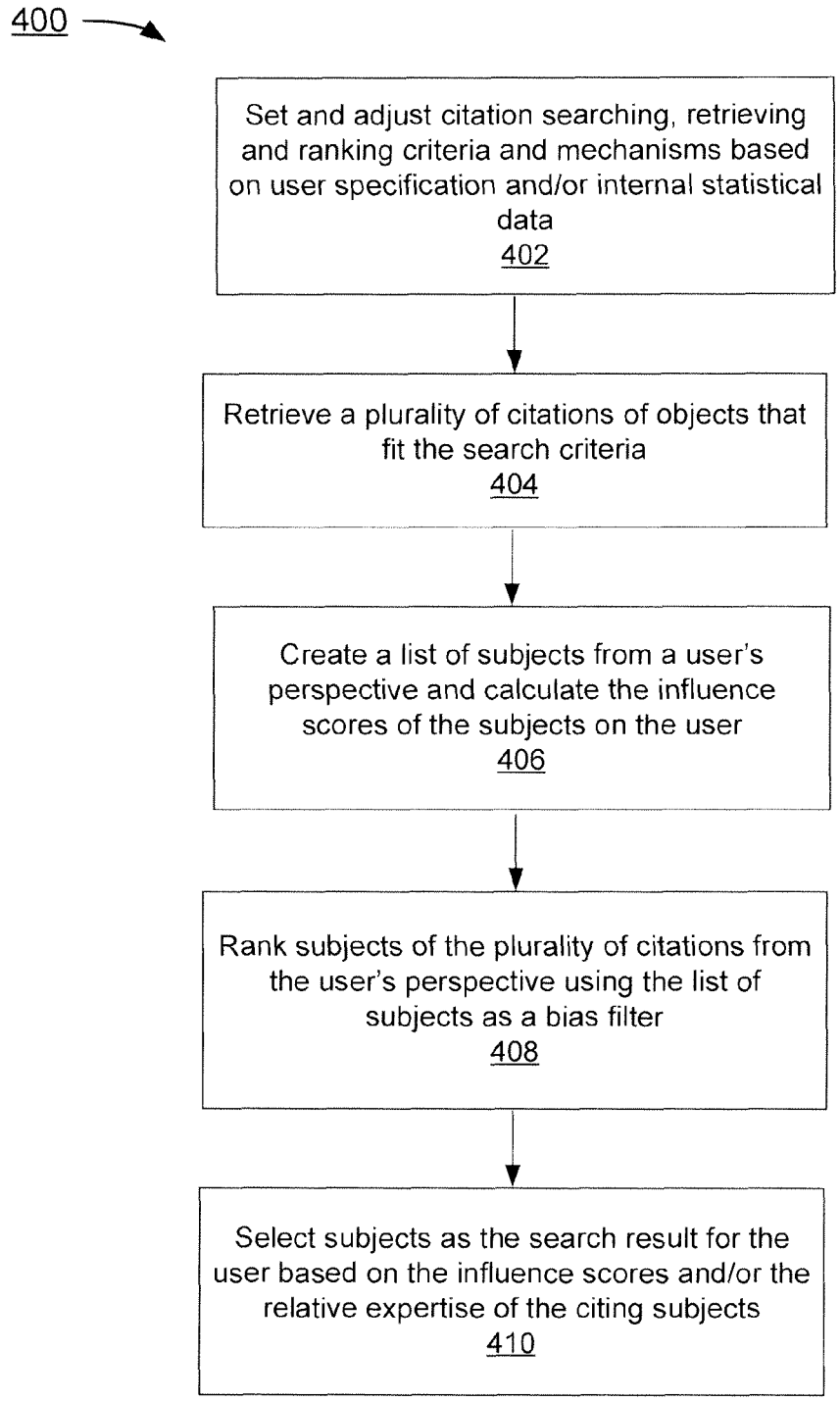
FIG. 4 depicts an example of a flowchart of a process to support customizing search results of citing subjects from user's perspective.

FIG. 4 depicts an example of a flowchart of a process to support customizing search results of citing subjects from user's perspective. In the example of FIG. 4, the flowchart 400 starts at block 402 where citation searching, retrieving and ranking criteria and mechanisms are set and adjusted based on user specification and/or internal statistical data. The flowchart 400 continues to block 404 where a plurality of citations of objects that fit the search criteria is retrieved. Here, the citations from the search result are, in one non-limiting example, the list of such citations that match the query terms for the search.

The flowchart 400 continues to block 406 where a list of subjects is created from the user's perspective and the influence scores of the subjects on the user are calculated. In some embodiments, influence evaluation engine 204 may construct the scored subject list of the user by flattening the user's network of sources/subjects/contacts up to a given number of degrees/levels/depth, where each item on the list is a subject/source (e.g., "user"/"author") and the score reflects the subject's potential influence or "closeness" of its connection/relation with the user. The influence evaluation engine 204 may calculate the "closeness" score based on the number and length of paths in a network from the user to that subject.

The flowchart 400 continues to block 408 where the list of subjects is used as a bias filter to rank the subjects of the plurality of citations from the user's perspective. In some embodiments, object/subject selection engine 206 may remove citations from subjects outside the user's subject list from the search result or ranked such citations lower in the search result. More specifically, object/subject selection engine 206 may rank the subjects appearing in the search result based on a ranking function that takes into consideration the above-described perspective "closeness" scores of the subjects of each matching citation on the user, as well as the "relative expertise" score of the subjects in the result. If a subject in the search result does not appear on the user's subject list, object/subject selection engine 206 may assign a lower score to the citations from the subject, and therefore to the subject itself, during ranking. With such closeness- and relative-expertise-weighted citation scores, subject that have a high degree of closeness to the user and a high relative expertise on the query term will be ranked prominently, thus biasing from the user's perspective the "people/expert" search results based on relative expertise on the query term. Consequently, due to the bias or filter, a search with identical terms may yield different search results for different users. The flowchart 400 ends at block 410 where subject are selected as the search result for the user based on the influence scores and/or the relative expertise of the citing subjects.

Media Identification and Search from Non-Media Author's Perspective

In some embodiments, object selection engine 206 supports media identification to classify and distinguish individual authors of social media citations or content items originated from commercial news sources ("media authors"). By filtering out commercial and news sources, object selection engine 206 is able to generates selected content items and the objects they cited from the perspective of individuals ("non-media authors") "on the ground." Here, a media user can be but is not limited to one of professional reporting and news agency such as a newspaper or broadcasting company. A user's activities/content items on a social media network include but are not limited to, citations, Tweets, replies and/or re-tweets to the tweets, posts, comments to other users' posts, opinions (e.g., Likes), feeds, connections (e.g., add other user as friend), references, links to other websites or applications, or any other activities on the social network. Such social content items are alternatively referred to hereinafter as citations, tweets, or posts.

In some embodiments, object selection engine 206 uses a whitelist and a trained probabilistic media type classifier either separately or in combination to assign each user/author of a content item either as a media type or non-media type. In some embodiments, object selection engine 206 derives the initial whitelist from a public list of social media sources and their respective verified accounts, which classify the users/owners of those accounts as either media type or non-media type authors. The whitelist can grow organically on an ongoing basis as more information about the types of the users are collected. In some embodiments, object selection engine 206 can utilize an archive of historical content items/posts with clear media type identifications as a training set to train the probabilistic media type classifier. Once trained, the media type classifier can then be used to predict the media types of each of the content items with high accuracy. For a non-limiting example, if the media type classifier has been trained by the historical archive to recognize a specific user/author as a media type, then the media type classifier may identify any retrieved content item/citation authored by the specific user also as from a media author.

In some embodiments, object selection engine 206 may review the profile of the user/author of a content item as well as historical post information by the same user to intelligently identify media/news source type the user belongs to. Some of the attributes and features of the user's information being reviewed by object selection engine 206 include but are not limited to:

Total number of posts
Total number of reposts
Percentage of posts that have links
Percentage of posts that are @replies
Total number of distinct domains from links posted
Average daily post count
Similarities to other media accounts
Profile URL matches a media site
Profile name of user matches a media name or a real human name Once the media types of the citations/content items are identified, object selection engine 206 can utilize such information to generate a customized search results from the perspective of one or more non-media type authors. In some embodiments, object selection engine 206 may remove citations from subjects/authors who have been identified as media-type authors from the search result or ranked such citations lower in the search result. More specifically, If the author/subject of a content item/citation in the search result has been identified as a media-type author, object selection engine 206 may assign a lower score to the citations from the subject during selection and/or ranking of the search results. With such an approach, citations/content items from ordinary individuals who are not associated with any professional media outlet will be selected and ranked prominently, thus biasing the search result towards non-media type author's perspective.

Figure 5:
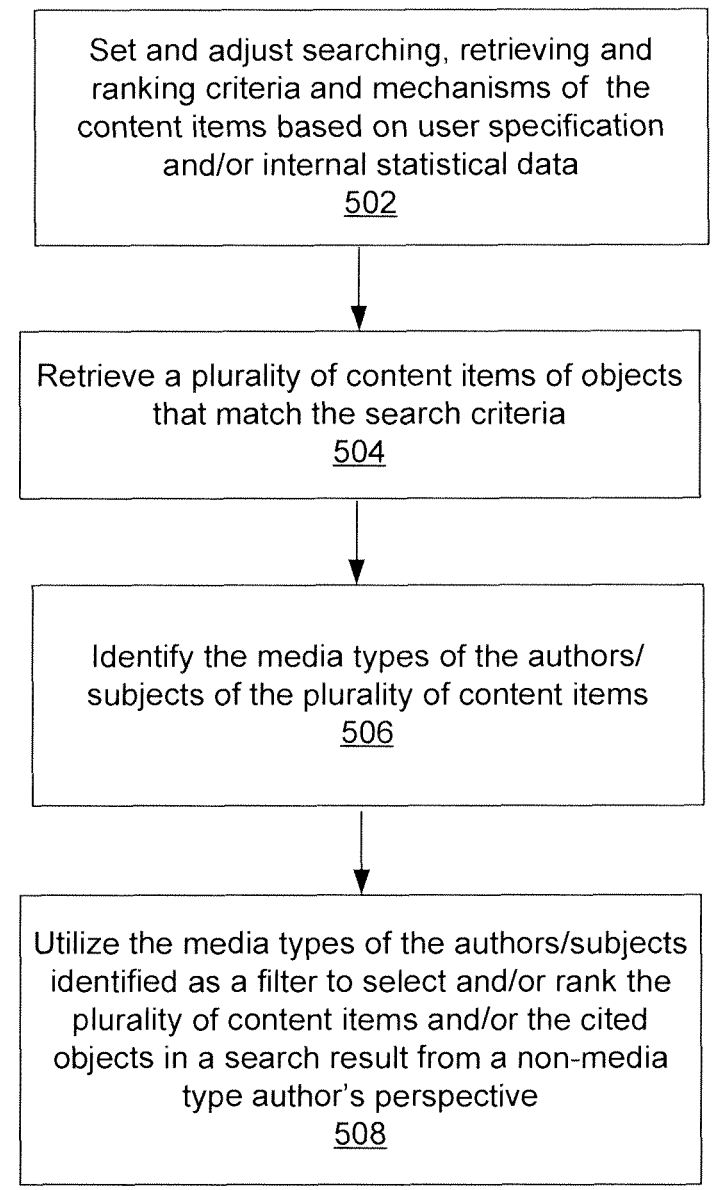
FIG. 5 depicts an example of a flowchart of a process to support customizing search results of from non-media status users' perspective.

FIG. 5 depicts an example of a flowchart of a process to support customizing search results of from non-media type users' perspective. In the example of FIG. 5, the flowchart 500 starts at block 502 where content item searching, retrieving and ranking criteria and mechanisms are set and adjusted based on user specification and/or internal statistical data. The flowchart 500 continues to block 504 where a plurality of content items that match the search criteria are retrieved. The flowchart 500 continues to block 506 where the media types of the authors/subjects of the plurality of content items are identified. The flowchart 500 ends at block 508 where the media types of the authors/subjects are utilized as a filter to select and/or rank the plurality of content items and/or the objects cited from non-media author's perspective.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more hosts to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "interface" is used in the embodiments of the systems and methods described above, it will be evident that such concept can be interchangeably used with equivalent software concepts such as, class, method, type, module, component, bean, module, object model, process, thread, and other suitable concepts. While the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system, comprising:
a citation search and analytics engine that includes a processor, which in operation, retrieves from a social network a plurality of content items composed by a plurality of subjects citing a plurality of objects that fit searching criteria specified by a user; and
an object selection engine that includes a processor, which in operation,
   receives a user-provided query with selection criteria including a separate media-affiliation status preference, identifies media affiliation status of the plurality of subjects of the plurality of content items meeting the query selection criteria,
   uses a whitelist and a trained probabilistic media type classifier either separately or in combination to assign a subject to each of the content items either as a media type or non-media type author, wherein the object selection derives the whitelist from a public list of social media sources and their respective verified accounts, which classify the users/owners of those accounts as either media type or non-media type authors engine,
   utilizes the media affiliation status of the plurality of subjects as a preference to select at least one of the plurality of content items or the cited objects such that those items/objects for which the plurality of subjects media affiliation status matches the user-provided media affiliation status preference, wherein the media affiliation status for one of the plurality of subjects is whether that subject is associated with a commercial news source,
   provides this selection in an un-ranked search result,
   computes and provides aggregated metrics based on this selection, and
   ranks the selected content items or cited object higher than other content items/cited objects in a ranked search result, based on whether the corresponding subject for the selected content items or cited object is associated with media affiliation status preference, wherein one of the selected content items or cited objects that is associated with the corresponding subject matching the media affiliation status preference is ranked higher than another one of the content items or cited objects associated with the corresponding subject not matching the media affiliation status preference.

2. The system of claim 1, wherein:
the social network is a publicly accessible web-based platform or community that enables its users/members to post, share, communicate, and interact with each other.

3. The system of claim 1, wherein:
the social network is one of, blogs, forums, or any other web-based communities.

4. The system of claim 1, wherein:
each of the plurality of content items includes one or more of: tweets, replies to the tweets, re-tweets to the tweets, posts, comments to other users' posts, opinions, feeds, connections, references, links to other websites or applications, or any other activities on the social network.

5. The system of claim 1, wherein:
each of the plurality of subjects is one of:
representation of a person, web log, and entities representing Internet authors or users of social media services, user of microblogging services, users of social networks, reviewer who provides expressions of opinion, reviews, or other information useful for the estimation of influence.

6. The system of claim 1, wherein:
each of the plurality of objects is one of:
Internet web sites, blogs, videos, books, films, music, image, video, documents, data files, objects for sale, objects that are reviewed or recommended or cited, subjects/authors, natural or legal persons, citations, or any entities that are associated with a Uniform Resource Identifier (URI).

7. The system of claim 1, wherein:
the citation search and analytics engine sets and adjusts searching, retrieving and ranking criteria and mechanisms of the content items based on user specification and/or internal statistical data.

8. The system of claim 1, wherein:
the media type of an author of a content item originated from a professional reporting or news agency is classified as a media type author.

9. The system of claim 1, wherein:
the media type of an individual of a content item not associated with a professional reporting or news agency is classified as a non-media type author.

10. The system of claim 1, wherein:
the object selection engine trains the media type classifier using an archive of historical content items with clear media type identifications as a training set; and
utilizes the trained the media type classifier to predict the media types of each of the content items with high accuracy.

11. The system of claim 1, wherein:
the object selection engine reviews profile of the user/author of a content item as well as historical post information by the same user to intelligently identify the media type the author belongs to.

12. The system of claim 1, wherein:
object selection engine removes content items from one of the plurality subject who have been identified as a media-type author from the search result or ranks such content items lower in the search result.

13. A method, comprising:
retrieving from a social network a plurality of content items composed by a plurality of subjects citing a plurality of objects that fit searching criteria specified by a user;
identifying media affiliation statuses of the plurality of subjects of the plurality of content items;
using a whitelist and a trained probabilistic media type classifier either separately or in combination to assign a subject to each of the content items either as a media type or non-media type author, wherein the whitelist is derived from a public list of social media sources and their respective verified accounts, which classify the users/owners of those accounts as either media type or non-media type authors engine;
utilizing the media affiliation status of the plurality of subjects as a preference to select at least one of the plurality of content items or the cited objects such that those items/objects for which the plurality of subjects media affiliation status matches a user-provided media-affiliation status preference, wherein the media affiliation status for one of the plurality of subjects is whether that subject is associated with a commercial news source;
providing this selection in an un-ranked search result;
computing and providing aggregated metrics based on this selection; and
ranking the selected content items or cited object higher than other content items/cited objects in a ranked search result, based on whether the corresponding subject for the selected content items or cited object is associated with the media affiliation status preference, wherein one of the selected content items or cited objects that is associated with the corresponding subject matching the media affiliation status preference is ranked higher than another one of the content items or cited objects associated with the corresponding subject not matching the media affiliation status preference.

14. The method of claim 13, further comprising:
setting and adjusting searching, retrieving and ranking criteria and mechanisms of the content items based on user specification and/or internal statistical data.

15. The method of claim 13, further comprising:
training the media type classifier using an archive of historical content items with clear media type identifications as a training set; and
utilizes the trained the media type classifier to predict the media types of each of the content items with high accuracy.

16. The method of claim 13, further comprising:
reviewing profile of one of the plurality of subjects of a content item as well as historical post information by the same user to intelligently identify the media type the author belongs to.

17. The method of claim 13, further comprising:
removing content items from one of the plurality of subjects who have been identified as a media-type author from the search result or ranking such content items lower in the search result.

18. A non-transitory machine-readable medium having executable instructions to cause one or more processing units to perform a method, the method comprising:
retrieving from a social network a plurality of content items composed by a plurality of subjects citing a plurality of objects that fit searching criteria specified by a user;
identifying media affiliation statuses of the plurality of subjects of the plurality of content items;
using a whitelist and a trained probabilistic media type classifier either separately or in combination to assign a subject to each of the content items either as a media type or non-media type author, wherein the whitelist is derived from a public list of social media sources and their respective verified accounts, which classify the users/owners of those accounts as either media type or non-media type authors engine;
utilizing the media affiliation status of the plurality of subjects as a preference to select at least one of the plurality of content items or the cited objects such that only those items/objects for which the plurality of subjects media affiliation status matches a user-provided media-affiliation status preference, wherein the media affiliation status for one of the plurality of subjects is whether that subject is associated with a commercial news source;
providing this selection in an un-ranked search result;
computing and providing aggregated metrics based on this selection; and
ranking the selected content items or cited object higher than other content items/cited objects in a ranked search result, based on whether the corresponding subject for the selected content items or cited object is associated with media affiliation status preference, wherein one of the selected content items or cited objects that is associated with the corresponding subject matching the media affiliation status preference is ranked higher than another one of the content items or cited objects associated with the corresponding subject not matching the media affiliation status preference.

* * * * *